(12) United States Patent
Takebe et al.

(10) Patent No.: US 11,697,274 B2
(45) Date of Patent: Jul. 11, 2023

(54) MOLDED ARTICLE AND PRODUCTION METHOD THEREFOR

(71) Applicant: Toray Industries, Inc., Tokyo (JP)

(72) Inventors: Yoshiki Takebe, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 449 days.

(21) Appl. No.: 16/977,862

(22) PCT Filed: Mar. 28, 2019

(86) PCT No.: PCT/JP2019/013728
§ 371 (c)(1),
(2) Date: Sep. 3, 2020

(87) PCT Pub. No.: WO2019/189631
PCT Pub. Date: Oct. 3, 2019

(65) Prior Publication Data
US 2021/0039291 A1 Feb. 11, 2021

(30) Foreign Application Priority Data

Mar. 30, 2018 (JP) ................................. 2018-067928

(51) Int. Cl.
*B32B 27/08* (2006.01)
*B29C 45/14* (2006.01)
(Continued)

(52) U.S. Cl.
CPC ........ *B32B 27/08* (2013.01); *B29C 45/14008* (2013.01); *C08J 5/042* (2013.01);
(Continued)

(58) Field of Classification Search
CPC .......... B29C 45/0005; B29C 45/14008; B29C 45/14065; B29C 45/14786;
(Continued)

(56) References Cited

U.S. PATENT DOCUMENTS

| 5,843,568 | A | 12/1998 | Masui et al. |
| 2019/0002654 | A1 | 1/2019 | Shinohara et al. |

FOREIGN PATENT DOCUMENTS

| JP | 02147218 A | 6/1990 |
| JP | 03253330 A | 11/1991 |

(Continued)

OTHER PUBLICATIONS

International Search Report and Written Opinion for International Application No. PCT/JP2019/013728, dated Jun. 25, 2019, 7 pages.

*Primary Examiner* — Lawrence D Ferguson
(74) *Attorney, Agent, or Firm* — RatnerPrestia

(57) ABSTRACT

A molded product having both small specific gravity and high stiffness and also suffering few sink marks is described along with a method for the production thereof, where the molded product includes a porous body (A) integrated with an injection molded body (B), the porous body (A) having an apparent density of 0.05 to 0.8 g/cm$^3$, the average thickness (tA) of the porous body (A) and the average thickness (tB) of the injection molded body (B) satisfying the relation tA≥3×tB, and the injection molded body (B) covering at least one face of the porous body (A).

12 Claims, 2 Drawing Sheets

(51) Int. Cl.
  *C08J 5/04* (2006.01)
  *C08J 9/00* (2006.01)
  *C08J 9/42* (2006.01)
  *B29K 101/12* (2006.01)

(52) U.S. Cl.
  CPC .............. *C08J 9/0085* (2013.01); *C08J 9/42* (2013.01); *B29K 2101/12* (2013.01); *B29K 2715/003* (2013.01); *C08J 2323/12* (2013.01); *C08J 2333/26* (2013.01); *C08J 2377/02* (2013.01); *C08J 2381/02* (2013.01); *C08J 2423/12* (2013.01); *C08J 2469/00* (2013.01); *C08J 2477/02* (2013.01); *C08J 2481/02* (2013.01)

(58) Field of Classification Search
  CPC .............. B29C 45/14795; B29C 45/14; B29K 2101/12; B29K 2715/003; B32B 2260/021; B32B 2260/046; B32B 2262/0246; B32B 2262/0253; B32B 2262/0261; B32B 2262/0269; B32B 2262/0276; B32B 2262/04; B32B 2262/101; B32B 2262/103; B32B 2262/105; B32B 2262/106; B32B 2266/0242; B32B 2274/00; B32B 2307/50; B32B 2307/72; B32B 2307/732; B32B 2457/00; B32B 2457/20; B32B 2605/003; B32B 2605/08; B32B 2605/18; B32B 27/065; B32B 27/08; B32B 27/12; B32B 27/281; B32B 27/285; B32B 27/286; B32B 27/288; B32B 27/302; B32B 27/304; B32B 27/308; B32B 27/32; B32B 27/322; B32B 27/34; B32B 27/36; B32B 27/365; B32B 27/38; B32B 27/40; B32B 5/022; B32B 5/024; B32B 5/18; C08J 2323/12; C08J 2333/26; C08J 2377/02; C08J 2381/02; C08J 2423/12; C08J 2469/00; C08J 2477/02; C08J 2481/02; C08J 5/042; C08J 9/0085; C08J 9/42; C08J 9/365; C03B 2201/34; C03B 37/01807

See application file for complete search history.

(56) References Cited

FOREIGN PATENT DOCUMENTS

| | | | |
|---|---|---|---|
| JP | 0780783 | A | 3/1995 |
| JP | 1058573 | A | 3/1998 |
| JP | 3019527 | B2 | 3/2000 |
| JP | 2003266476 | A | 9/2003 |
| JP | 2006077342 | A | 3/2006 |
| JP | 2007076081 | A | 3/2007 |
| JP | 6248466 | B2 | 12/2017 |
| WO | 2017110532 | A1 | 6/2017 |

[Fig. 1]
(a) 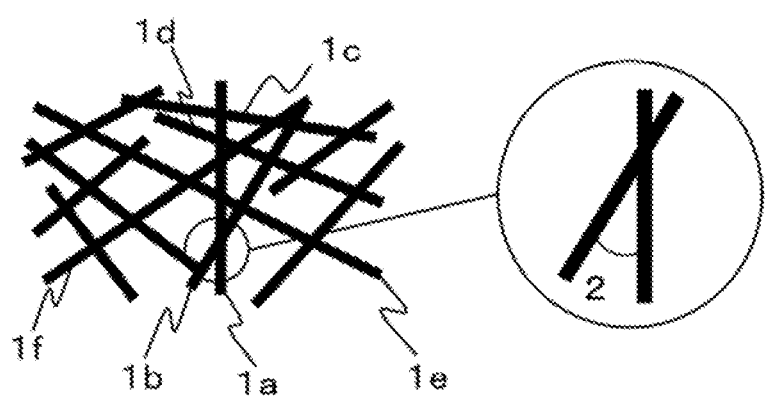
(b) 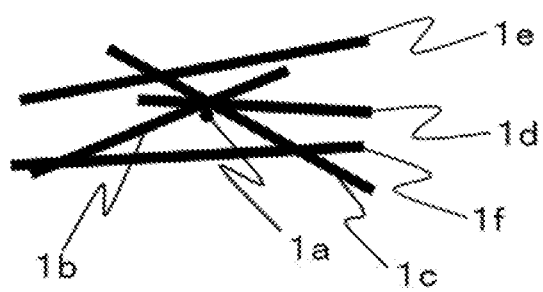
[Fig. 2]
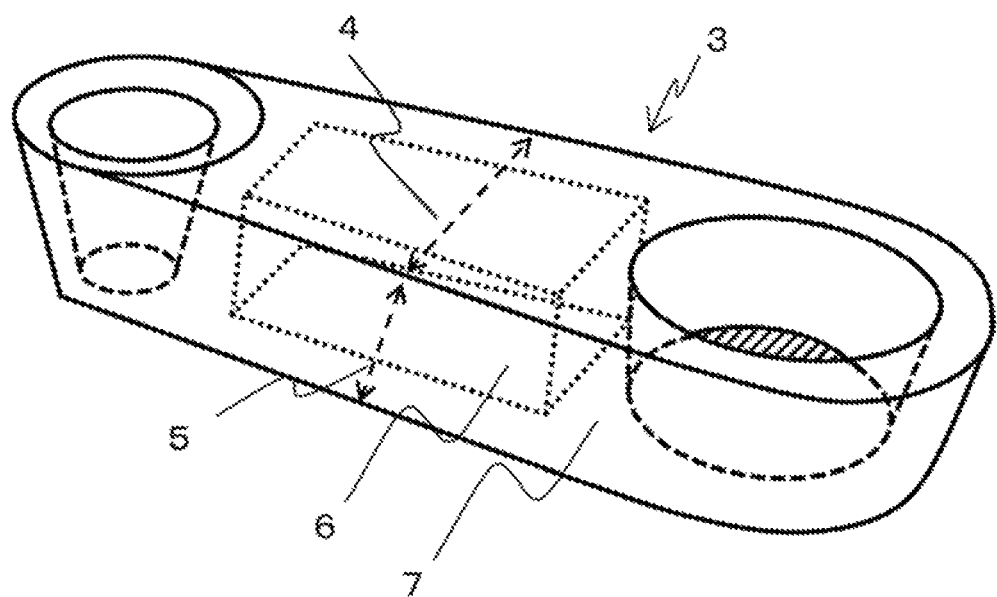

[Fig. 3]
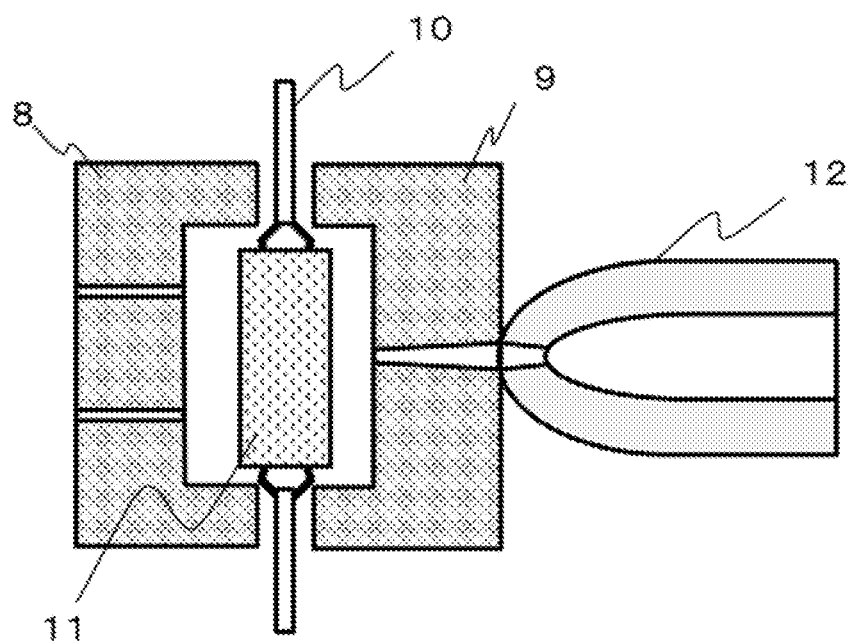
[Fig. 4]
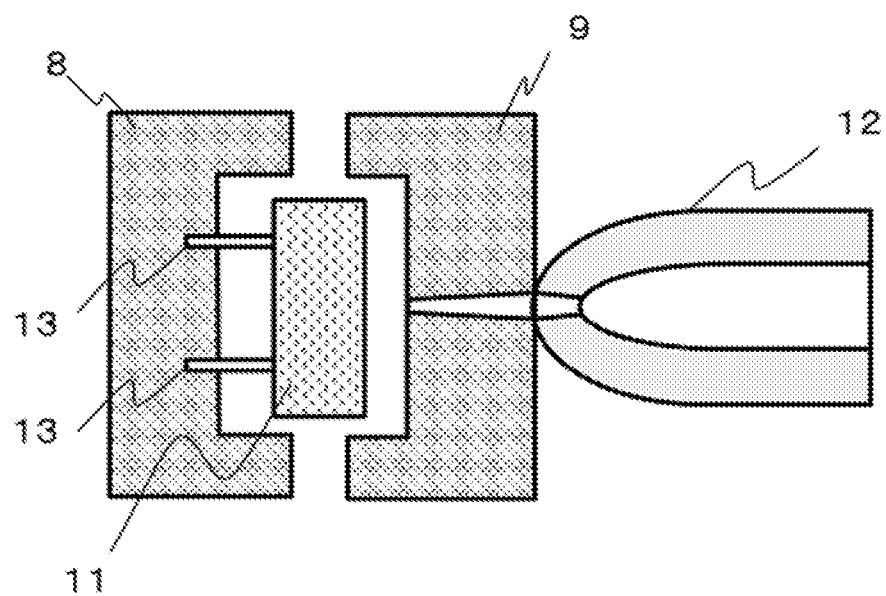

MOLDED ARTICLE AND PRODUCTION METHOD THEREFOR

CROSS REFERENCE TO RELATED APPLICATIONS

This is the U.S. National Phase application of PCT/JP2019/013728, filed Mar. 28, 2019, which claims priority to Japanese Patent Application No. 2018-067928, filed Mar. 30, 2018, the disclosures of these applications being incorporated herein by reference in their entireties for all purposes.

FIELD OF THE INVENTION

The present invention relates to a molded product that is both light in weight and high in the freedom of molded product thickness and suffers few sink marks, and a method for the production thereof.

BACKGROUND OF THE INVENTION

In recent years, there are increasingly stronger calls for highly rigid and lightweight materials for industrial products such as automotive components and sports goods. In order to meet such demands, fiber reinforced resins that are high in stiffness and light in weight are now widely used in various industrial applications. In these applications, importance has been attached mainly to the good mechanical properties of reinforcing fibers in developing articles suitable for high strength and high stiffness members. In addition, in commercializing molded products formed from fiber reinforced resins, it has been necessary to meet design requirements for thick members and to meet separate design requirements for various products in order to realize particular shapes required to ensure high stiffness. Therefore, techniques that uses injection of molten or uncured resin into a mold cavity, such as injection molding, which is advantageous for forming shapes, have been adopted. However, as for molded products, along with methods for the production thereof, that not only satisfy these requirements for light weight and stiffness but also can be designed to form particular shapes, there have been only few disclosed molding methods such as a technique focusing on adhesive bonding of a thermoplastic resin serving as surface material to a member or a core material serving to develop stiffness (see Patent documents 1, 2. and 3).

PRIOR ART DOCUMENTS

Patent Documents

Patent document 1: Japanese Patent No. 3019527
Patent document 2: Japanese Unexamined Patent Publication (Kokai) No. 2007-76081
Patent document 3: Japanese Patent No. 6248466

SUMMARY OF THE INVENTION

However, although Patent documents 1, 2, and 3 adopt methods that employ good shape forming techniques, such as injection molding, with the aim of not only meeting weight reduction requirements but also forming various required shapes, it is impossible for them to realize reduction in weight, that is, serve to produce molded products having required densities and specific gravities, because they do not take into account the idea of using porous bodies, etc., even if they may serve to form intended shapes. In addition, even the molded product manufacturing methods using the injection molding technique cannot always serve suitably for molding because the resulting products suffer dents, which are generally called sink marks, found in thicker portions.

The main object of the present invention, which was made in view of the above problems, is to provide a molded product that is both light in weight and high in the freedom of molded product thickness to ensure improving stiffness and suffering few sink marks, and also provide a method for the production thereof.

As a result of intensive studies for solving the aforementioned problems, the present inventors have found that the molded product and the method for the production thereof described below.

The molded product according to the present invention is a molded product including a porous body (A) integrated with an injection molded body (B), the porous body (A) having an apparent density of 0.05 to 0.8 $g/cm^3$,
the average thickness (tA) of the porous body (A) and the average thickness (tB) of the injection molded body (B) satisfying the relation $tA \geq 3 \times tB$, and the injection molded body (B) covering at least one face of the porous body (A).

Another embodiment of the molded product according to the present invention is a molded product including a porous body (A) integrated with an injection molded body (B), the porous body (A) having an apparent density of 0.05 to 0.8 $g/cm^3$,
the average thickness (tA) of the porous body (A) and the average thickness (tB) of the injection molded body (B) satisfying the relation $tA \geq 3 \times tB$,
and the injection molded body (B) covering at least part of the surface of the porous body (A) in the molded product.

Furthermore, the method for producing the molded product according to the present invention includes a step for inserting a porous body (a) into a mold cavity, a step for closing the mold, an injection molding step for injecting a molten molding material (b) containing a thermoplastic resin, and a molding step for shaping the material resulting from the foregoing injection molding step, the porous body (a) having an apparent density of 0.05 to 0.8 $g/cm^3$ and having a compressive strength at 10% compression of 1.5 MPa or more as measured according to ISO844 (2004), and the molding material (b) containing a thermoplastic resin.

The above porous body (A) is referred to as porous body (a) before it is integrated with the injection molded body (B). Furthermore, the injection molded body (B) is obtained by melting and injecting the molding material (b) in the injection molding step.

On the basis of the molded product and the method for the production thereof according to the present invention, it is possible to provide a molded product that is both light in weight and high in the freedom of molded product thickness and suffers few sink marks, and also provide a method for the production thereof.

BRIEF DESCRIPTION OF THE DRAWINGS

FIG. 1 A schematic diagram of a typical dispersion state of reinforcing fibers in the porous body (a) or the porous body (A) used for the present invention.

FIG. 2 A schematic diagram of a typical molded product according to the present invention.

FIG. 3 A schematic diagram of a typical method (mechanical clamping mechanism) for producing the molded product according to the present invention.

FIG. 4 A schematic diagram of a typical method (needle mechanism) for producing the molded product according to the present invention.

DETAILED DESCRIPTION OF EMBODIMENTS OF THE INVENTION

Described below is the molded product according to the present invention and the method for the production thereof.

The first embodiment of the molded product according to the present invention is a molded product including a porous body (A) integrated with an injection molded body (B), the porous body (A) having an apparent density of 0.05 to 0.8 g/cm$^3$, the average thickness (tA) of the porous body (A) and the average thickness (tB) of the injection molded body (B) satisfying the relation tA≥3×tB, and the injection molded body (B) covering at least one face of the porous body (A). In this embodiment, the porous body (A) has a shape composed of a plurality of faces, and at least one of the plurality of faces of the porous body (A) is covered by the injection molded body (B). A face as referred to herein may be either a flat face or a curved surface. A shape composed of a plurality of faces means a shape composed of at least one independent region surrounded by ridge lines and other regions. A ridge line is the line where the tangent planes to the faces on both sides thereof cross each other, and in the case of a curved ridge portion, the ridge is assumed to be a ridge line that is not curved if the radius of curvature is 1 mm or less.

The second embodiment of the molded product according to the present invention is a molded product including a porous body (A) integrated with an injection molded body (B), the porous body (A) having an apparent density of 0.05 to 0.8 g/cm$^3$, the average thickness (tA) of the porous body (A) and the average thickness (tB) of the injection molded body (B) satisfying the relation tA≥3×tB, and the injection molded body (B) covering at least part of the surface of the porous body (A) in the molded product. In this embodiment, the porous body (A) may be formed of one continuous curved surface or may be formed of a plurality of faces as long as at least part of the surface of the porous body (A) in the molded product is covered by the injection molded body (B).

[Molded Product]

The molded product according to the present invention includes a porous body (A) integrated with an injection molded body (B). The integration of the porous body (A) and the injection molded body (B) serves to realize a reduced weight that cannot be achieved by the injection molded body (B) alone. In addition, this realizes mechanical properties including stiffness and molded product surface properties that cannot be achieved by the porous body (A) alone. Here, integration means adhesion or joining of the porous body (A) and the injection molded body (B) at the interface where they are in contact with each other. Here, adhesion refers to a state in which thermoplastic resins or thermosetting resins are integrated at their interfaces via chemical bonds, and in this case, chemical bonds includes a state in which resins located on both sides of a interface are mixed and bonded by fusion or welding. Furthermore, it also includes a state in which each of the resins sandwiching an adhesive layer formed at the interface are chemically bonded to the adhesive layer. Joining means a state in which they are bonded by mechanical interlocking, i.e., anchoring, at the interface. Specific examples of such integration of a porous body (A) and an injection molded body (B) include a state in which a porous body (A) and an injection molded body (B) are integrated through fusion of the matrix resins contained therein, a state achieved by previously providing thermoplastic resins or thermosetting resins having adhesiveness in a region where an interface between a porous body (A) and an injection molded body (B) is to be formed, which are then fused by heat or pressure applied during the production process described later, or a state in which a porous body (A) and an injection molded body (B) are integrated via an anchoring structure formed as a result of the penetration of the resin component of the latter into voids existing in the former.

In addition, the porous body (A) has an apparent density of 0.05 to 0.8 g/cm$^3$. Here, the apparent density of the porous body (A) is measured by cutting out the porous body (A) alone from the molded product to prepare a test piece and examining it according to JIS K7222 (2005). When examining the apparent density of the porous body (A), an accurate apparent density measurement can be obtained if a test piece of porous body (A) is prepared by removing the portion that accounts for 20% or more of the thickness measured from the interface where the porous body (A) is in contact with the injection molded body (B) towards the center of the porous body (in the depth direction). If having an apparent density of more than 0.8 g/cm$^3$, the porous body (A) is not preferred because the resulting molded product will have a large mass. If having an apparent density of less than 0.05 g/cm$^3$, which is the lower limit, the porous body (A) will be too small in volume fraction of solids and suffer deterioration in mechanical properties, particularly the compression property, although being light in weight. From the viewpoint of allowing the porous body (A) to maintain good mechanical properties, it is preferable for the porous body (A) to have an apparent density of 0.1 g/cm$^3$ or more, and in light of the balance between apparent density and mechanical properties, furthermore, it is more preferable for the porous body (A) to have an apparent density of 0.2 g/cm$^3$ or more.

In addition, the average thickness (tA) of the porous body (A) and the average thickness (tB) of the injection molded body (B) satisfy the relation tA≥3×tB. This means that the porous body (A) in the molded product needs to have a thickness three times or more as large as the average thickness (tB) of the injection molded body (B), and this makes it possible to produce a molded product having a large thickness that cannot be realized in the conventional injection molded bodies and allow the injection molded body (B) to have a relatively small thickness, thus ensuring easy suppression of sink marks, which generally occur in thick injection molding products, and leading to molded products having improved dimensional accuracy and yield. If the average thickness (tA) of the porous body (A) and the average thickness (tB) of the injection molded body (B) do not satisfy the relation tA≥3×tB, the advantage that the use of a porous body having a small apparent density serves to produce a molded product having a small apparent density cannot be realized sufficiently, resulting in an insufficient weight reduction effect. In addition, if the porous body has a smaller thickness, the aforementioned molded product is likely to suffer sink marks on the surface of the injection molded body.

From the viewpoint of improving the lightness of the molded product, the maximum thickness of the porous body (A) is preferably 3 mm or more, more preferably 5 mm or more, and particularly preferably 10 mm or more. Although there is no particular limitation on the upper limit, an appropriate upper limit may be set from the viewpoint of product design that adopt the molded product according to the present invention. From the viewpoint of improving the lightness of the molded product, the minimum thickness of the porous body (A) is preferably 3 mm or more, more preferably 5 mm or more, and particularly preferably 10 mm or more. Although there is no particular limitation on the upper limit of the minimum thickness of the porous body (A), it is preferably 1,000 mm or less.

Here, in the case where it is difficult to identify which direction represents the thickness of the porous body (A), the reinforcing fibers are examined to determine whether they can be considered to be oriented dominantly in a particular direction, and if such a dominant orientation direction exists, this direction is defined as in-plane direction whereas the direction perpendicular to the in-plane direction is defined as out-of-plane direction. Then, the out-of-plane direction seen from the boundary with the injection molded body (B) is defined as thickness direction.

Alternatively, the direction perpendicular to the tangent plane on the interface between the porous body (A) and the injection molded body (B) may be defined as thickness direction of the porous body (A). It is noted that in the case of a molded product in which the porous body (A) and the injection molded body (B) are integrated by joining via anchoring, the interface between the porous body (A) and the injection molded body (B) is determined on the assumption that the injection molded body (B) extends to the point where the resin of the injection molded body (B) penetrates by anchoring.

Then, it is preferable for the injection molded body (B) to have a maximum thickness of 1 mm or less from the viewpoint of preventing the formation of sink marks on the resulting molded product. Furthermore, in view of providing a molded product with a reduced weight, it is preferably 0.8 mm or less, and particularly preferably 0.5 mm or less. Although there is no particular limitation on the lower limit, it is commonly preferable for the lower limit to be 0.1 mm or more. Here, in the case where it is difficult to identify which direction represents the thickness of the injection molded body (B), the injection molded body (B) is examined to determine the face having the largest area, and the direction perpendicular to the in-plane direction in that face is defined as out-of-plane direction. Then, the out-of-plane direction seen from the boundary with the porous body (A) is defined as thickness direction. Alternatively, as in the case the porous body (A), an interface is defined, and the direction perpendicular to the tangent plane to the interface between the porous body (A) and the injection molded body (B) may be defined as thickness direction.

Here, the average thickness to of the porous body (A) and the average thickness tB of the injection molded body (B) can be measured by the procedure described below. By cutting the molded product, a cross section that includes an appropriately selected line perpendicular to the tangent plane to the interface between the porous body (A) and the injection molded body (B) is exposed for use as measuring point, and the cross section is examined under an optical microscope or an electron microscope to measure the thickness of the porous body (A) and the thickness of the injection molded body (B), followed by calculating the arithmetic averages of the measurements to represent them. It is noted that it is desirable to adopt as many measurement points as possible, but practically, it is enough if measurements are taken at 10 equally spaced points. The thickness data taken at these measuring points are examined to find the smallest of the thickness measurements of the porous body (A) and the largest of the thickness measurements of the injection molded body (B), from which the minimum thickness of the porous body (A) and the maximum thickness of the injection molded body (B) can be determined.

To determine the thinnest portion of a molded product in which the thicknesses of the porous body (A) and the injection molded body (B) are not constant in the cross section, five lines perpendicular to the tangent plane to the interface between the porous body (A) and the injection molded body (B) in the molded product are appropriately selected, and cross sections that includes them are exposed by cutting and observed under an optical microscope or an electron microscope. Then, the thickness of the porous body (A) and the thickness of the injection molded body (B) are each measured at 10 or more equally spaced points in each cross section to represent the thinnest portion.

The molded product according to the first embodiment of the present invention can be produced by injecting a molding material (b) in an molten state and allowing it to cover at least one face of a porous body (a) having an apparent density of 0.05 to 0.8 g/cm$^3$ and a compressive strength at 10% compression of 1.5 MPa or more as measured according to ISO844 (2004). Furthermore, the molded product according to the second embodiment of the present invention can be produced by injecting a molding material (b) in an molten state and allowing it to cover at least part of the surface of a porous body (a) having an apparent density of 0.05 to 0.8 g/cm$^3$ and a compressive strength at 10% compression of 1.5 MPa or more as measured according to ISO844 (2004).

In the production process described later, in which a molding material (b) is allowed to cover at least one face, or at least part of the surface, of a porous body (a) to realize their integration, the molding material (b) in the molten state is cooled to form the injection molded body (B).

For the molded product according to the present invention, 80% or more of the total area of the projected view of the porous body (A) projected from one direction is preferably covered by the injection molded body (B) in order to allow the surface properties of the injection molded body (B) to be imparted as effectively as possible to the molded product and to minimize the fear that the portions uncovered by the injection molded body (B) will act, as fragile portions, to deteriorate the mechanical properties of the molded product. From a similar viewpoint, it is preferable that 90% or more, particularly preferably 100%, of the total area of the projected view is covered by the injection molded body (B). To determine the "rate of coverage", the projected area (S1) of the molded product is enlarged by 10 times under a laser microscope, and the observation image obtained is analyzed using, for example, a general-purpose image analysis program, to determine the area (S1) of the entire molded product. Subsequently, the area (S2) of the portions where the porous body (A) is exposed out of the molded product is measured similarly using a laser microscope, followed by making a calculation by the following equation.

$$\text{Rate of coverage by injection molded body (\%)} = S2/S1 \times 100$$

From the viewpoint of easy penetration of the molding material (b) into the porous body (a) described above, it is preferable for the porous body (a) to be at least in the form of an interconnected-cell porous body in the portions where it is in contact with the molding material (b).

As for the continuous form of the voids in the porous body (a), it is preferable that voids are interconnected at least to the penetration depth described later. The voids are not necessarily interconnected throughout the porous body (a), and may be isolated in the portions where the molding material (b) does not exist.

In addition, in order to ensure firm integration of the porous body (A) and the injection molded body (B), it is preferable for the anchoring depth of the molding material (b) penetrating into the porous body (a) is in the range of 10 μm to 100 μm. This is because a firm joined state for the integration of the porous body (A) and the injection molded body (B) can be developed at the interface when it contains a so-called anchoring structure. It is more preferably in the range of 30 μm to 100 μm, and particularly preferably 50 μm to 100 μm.

The anchoring depth is determined as follows. A small piece is cut out of the molded product, embedded in an epoxy resin, and polished so that a cross section perpendicular to the thickness direction of the molded product will be exposed to serve as observation surface, thereby preparing a sample. The sample is magnified under a laser microscope, and 10 positions where the fields of view do not overlap are randomly selected and photographed. In the photographed image, the boundary layer between the resin constituting the porous body (A) and the resin constituting the injection molded body (B) is observed and the difference in brightness between the resins is confirmed. They are judged to be in a fused state if a boundary showing difference in brightness is not seen in the boundary layer between the resin constituting the porous body (A) and the resin constituting the injection molded body (B). They are judged to be in an anchored state if a boundary showing difference in brightness is seen in the boundary layer between the porous resin constituting the porous body (A) and the resin constituting the injection molded body (B), with the boundary having an irregular shape. The anchoring depth is defined as follows. The irregularities in the boundary are examined to determine the vertical drop between the deepest valley and the highest peak, which is referred to as maximum vertical drop dmax, in each field of view and the vertical drop between the shallowest valley and the lowest peak, which is referred to as minimum vertical drop dmin, in each field of view. Of the 10 dmax values obtained from these fields of view, the largest one is defined as the maximum height Ry (μm) in the irregularities in the boundary layer. In addition, from the dmax and dmin values obtained above, the average roughness Rz over the irregularities in the boundary layer, which is defined as anchoring depth, is calculated by the following equation.

$$Rz(\mu m) = \Sigma(di\ max + di\ min)/2n$$

di max: maximum vertical drop (μm) in each field (i=1, 2, . . . 10)

di min: minimum vertical drop (μm) in each field (i=1, 2, . . . 10)

Furthermore, in order to realize firmer integration between the porous body (A) and the injection molded body (B), the thermoplastic resin constituting the porous body (a) and the thermoplastic resin constituting the molding material (b) are integrated by both fusion based joining and an anchoring structure having a penetration depth as described above.

In addition, when comparing the porous body (a) before integration and the porous body (A) in the molded product after integration, the percent change in apparent density is preferably 10% or less as a production condition from the viewpoint of shape stability of the molded product. This production condition can be met by using a porous body (a) having a high compressive strength, which can be realized by, for example, incorporating reinforcing fibers in the porous body (a) as a constituent component. This is because the strength of the reinforcing fiber serves to allow the porous body (A) to remain resistant to dimensional deformation even when processed by an integration method that applies a high pressure, such as injection molding, thus making it possible to produce a molded product with few sink marks. From the above viewpoint, when comparing the porous body (a) used as raw material and the porous body (A) in the molded product, the percent change in apparent density is more preferably 5% or less. Here, the apparent density of the porous body (a) can be measured according to JIS K7222 (2005). Furthermore, the percent change in the apparent density can be calculated from the apparent density of the porous body (a) and that of the porous body (A) by the following formula.

$$\text{Percent change in apparent density [\%]} = \{(\text{apparent density of porous body (A)} - \text{apparent density of porous body (a)})/\text{apparent density of porous body (a)}\} \times 100$$

[Porous Body (a)]

The porous body (a) used for the present invention has an apparent density of 0.05 to 0.8 g/cm$^3$ and has a compressive strength at 10% compression of 1.5 MPa or more as measured according to ISO844 (2004). If the porous body (a) has an apparent density of more than 0.8 g/cm$^3$, it is not preferred because it means that the porous body (A) formed therefrom will have a larger mass, thus leading to a molded product also having a larger mass. If having an apparent density of less than 0.05 g/cm$^3$, which is the lower limit, the porous body (a) will be too small in volume fraction of the constituent solid components and suffer deterioration in mechanical properties, particularly the compression property, although being light in weight. From the viewpoint of allowing the porous body (a) to maintain good mechanical properties, it is preferable for the porous body (a) to have an apparent density of 0.1 g/cm$^3$ or more, and in light of the balance between apparent density and mechanical properties, furthermore, it is more preferable for the porous body (a) to have an apparent density of 0.2 g/cm$^3$ or more.

The porous body (a) preferably has a compressive strength at 10% compression of 1.5 MPa or more as measured according to ISO844 (2004) from the viewpoint of shape retention of the molded product. Here, the sample to be used should be cut out so that the test direction of the compression test coincides with the out-of-plane direction. The out-of-plane direction of a porous body (a) that contains reinforcing fibers means the direction perpendicular to the orientation direction of the reinforcing fibers, which is determined based on observation of the cross section. Compared to this, in the case where the porous body (a) does not contain reinforcing fibers, the face having the largest area is identified as reference and the direction perpendicular to this is defined as out-of-plane direction for compressive strength measurement. Here, the orientation direction means the length direction of the reinforcing fibers. Having a compressive strength at 10% compression of 1.5 MPa or more, the porous body (a) is high in shape retainability and, at the same time, serves to prevent dimensional change from being caused by the injection pressure applied during the injection molding of the molding material (b). In practice, it works effectively if it has a compressive strength at 10% compression of 1.5 MPa or more, but it is preferable to have a value of 5 MPa or more. Although there is no upper limit to the compressive strength at 10% compression, it is usually enough if it has a value of 50 MPa in order to ensure a good relation among the strength of the reinforcing fibers, that of the matrix resin, and the content of voids.

Here, it is preferable that the porous body (a) and the porous body (A) contain reinforcing fibers (A-1) and thermoplastic resin (A-2) from the viewpoint of the ease of production of the porous body (a) and bonding with the molding material (b). (Hereinafter, unless otherwise specified, reinforcing fibers (A-1) are referred to as reinforcing fibers. And thermoplastic resins (A-2) are referred to as thermoplastic resins.) Examples of the reinforcing fibers include metal fibers such as of aluminum, brass, and stainless steel, insulating fibers such as PAN-based, rayon-based, lignin-based, and pitch-based carbon fibers, graphite fibers, and glass fibers, organic fibers such as of aramid, PBO, polyphenylene sulfide, polyester, acrylic, nylon, and polyethylene, and inorganic fibers such as of silicon carbide and silicon nitride. Furthermore, these fibers may be surface-treated. Useful surface treatment methods include deposition of a conductive material such as metal, treatment with a coupling agent, treatment with a sizing agent, treatment with a binding agent, and attachment of an additive. Furthermore, these different types of fibers may be used singly or may be used as a combination of two or more thereof. From the viewpoint of weight reduction, in particular, carbon fibers such as PAN-based, pitch-based, and rayon-based ones are preferred because they have high specific strength and high specific stiffness. In addition, in order to provide a molded product with enhanced economical features, the use of glass fibers is preferred, and combined use of carbon fibers and glass fibers is particularly preferred from the viewpoint of the balance between mechanical properties and economical features. Furthermore, in order to provide a molded product with enhanced impact absorbability and shapeability, the use of aramid fibers is preferred, and combined use of carbon fibers and aramid fibers is particularly preferred from the viewpoint of the balance between mechanical properties and impact absorbability. In addition, in order to impart conductivity to the molded product according to the present invention, it may be effective to use metal fibers formed from a conductive metal or reinforcing fibers coated with a metal such as nickel, copper, or ytterbium. In particular, it is preferable to use reinforcing fibers selected from the group consisting of metal fibers, pitch-based carbon fibers, and PAN-based carbon fibers, which have good mechanical properties such as strength and elastic modulus.

For the reinforcing fibers, the term "substantially monofilament form" is used to refer to a fine strand consisting of less than 500 single reinforcing fiber filaments. It is more preferable that they are in the form of dispersed monofilaments, that is, dispersed single filaments.

Here, the term "substantially monofilament-like dispersion" or "monofilament-like dispersion" means that the probability (hereinafter occasionally referred to as fiber dispersion percentage) that a single fiber randomly selected from the reinforcing fibers in a porous body (a) or a porous body (A) has a two dimensional orientation angle of 1 degree or more is 80% or more, or, in other words, that bundles each containing two or more single fibers that are in contact with each other and parallel to each other in the porous body (a) account for less than 20%. Accordingly, it is particularly preferable here that fiber bundles containing 100 filaments or less account for a mass fraction of 100% in the reinforcing fiber. If the reinforcing fibers are in such a state, the shapeability into a complex shape will be high when a precursor of the porous body (a) is shaped by applying an external force.

Furthermore, it is preferable for the reinforcing fibers to be in a randomly dispersed state. Here, the term "reinforcing fibers in a randomly dispersed state" means that reinforcing fibers randomly selected from the porous body (a) have an arithmetic average two dimensional orientation angle in the range of 30 degrees or more and 60 degrees or less. The two dimensional orientation angle means the angle formed between a single fiber selected from the reinforcing fibers and another single fiber intersecting the former and it is the acute one of the angles formed by the single fibers intersecting each other and in the range of 0 degree or more and 90 degrees or less. If the reinforcing fibers are in such a state, denser voids will be formed by the reinforcing fibers and the weak portions at the ends of fiber bundles of reinforcing fibers in the porous body (a) can be minimized, thereby leading to not only enhanced reinforcing efficiency and reliability but also isotropy.

This two dimensional orientation angle will be described in more detail below with reference to drawings. FIG. 1(a) is a schematic view of a two dimensional projection showing the dispersion state of the reinforcing fibers, and FIG. 1(b) is a schematic view of a cross section showing the dispersion state of the reinforcing fibers. Focusing on the single fiber 1a in FIG. 1(a), the single fiber 1a intersects other single fibers 1b to 1f. Here, the term "intersecting" means a state in which a single fiber focused on is seen to intersect another single fiber in a two dimensional plane (projected plane) being observed, and the single fiber 1a is not necessarily in contact with any of the single fibers 1b to 1f in the three dimensional space. To describe it in more detail with reference to drawings, FIG. 1(b) shows a cross section perpendicular to the length direction of the single fiber 1a, and the single fiber 1a extends in the perpendicular direction to the plane of the diagram. The single fiber 1a is not in contact with either the single fiber 1e or the single fiber 1f. However, when projected onto the two dimensional plane shown in FIG. 1(a), the single fiber 1a intersects all of the single fibers 1b to 1f, thereby making two dimensional orientation angles. In other words, the term "intersecting" encompasses a state in which two of them are seen to cross each other when projected onto a particular plane. When focusing on the single fiber 1a, therefore, all of the single fibers 1b to 1f are subjects of evaluation for the two dimensional orientation angle, and in FIG. 1(a), the two dimensional orientation angle is the acute one of the two angles formed by any two single fibers intersecting each other and is in the range of 0 degree or more and 90 degrees or less (a two dimensional orientation angle 2 is illustrated in FIG. 1(a)).

Although there is no particular limitation on the method to be used to measure the two dimensional orientation angle, but for example, it can be determined by observing the orientation of the reinforcing fibers in the surface of the porous body (a) or the porous body (A). The average two dimensional orientation angle is determined by the procedure described below. Specifically, a single fiber (the single fiber 1a in FIG. 1) is selected randomly and the two dimensional orientation angle is measured for all single fibers that intersect it (single fibers 1b to 1f in FIG. 1), followed by calculating the average. If there are a very large number of single fibers that intersect the selected one, 20 single fibers are selected randomly from the intersecting ones and their arithmetic average may be adopted instead. Based on other single fibers, this measuring procedure is carried out five times repeatedly and the results are arithmetically averaged to provide the arithmetical average of the two dimensional orientation angle.

The substantially monofilament-like, random dispersion of the reinforcing fibers serves to maximize the performance realized by the aforementioned reinforcing fibers dispersed in a substantially monofilament-like form. In addition, this also serves to allow the porous body (a) or the porous body (A) to have isotropic mechanical properties. From such a viewpoint, the reinforcing fibers preferably has a fiber dispersion percentage of 90% or more, more preferably as close to 100% as possible. Furthermore, it is preferable that the arithmetic average of the two dimensional orientation angle of the reinforcing fibers is in the range of 40° or more and 50° or less, more preferably as close to 45°, which is the ideal angle, as possible. As regards the preferable range of the two dimensional orientation angle, any of the aforementioned upper limits given above may be adopted as upper limit, and any of the aforementioned lower limits given above may be adopted as lower limit.

On the other hand, examples of materials in which reinforcing fibers are not randomly dispersed include sheet-like base materials in which reinforcing fibers are paralleled one direction, woven fabric base materials, and non-crimped base materials. In materials of these forms, reinforcing fibers are arranged regularly and densely to prevent the formation of voids in large numbers in the porous body (a), and accordingly, impregnation with resin can become extremely difficult, possibly leading to the formation of unimpregnated portions or an extremely limited range of useful impregnation means or resin types in some cases.

Preferred forms of reinforcing fibers include discontinuous reinforcing fibers cut to finite length, which ensure easy impregnation with thermoplastic resin and easy adjustment of the amount thereof.

In addition, it is also preferable that the thermoplastic resin used for the present invention contains at least one or more thermoplastic resins. To cite useful thermoplastic resins, crystalline ones include polyesters such as polyethylene terephthalate (PET), polybutylene terephthalate (PBT), polytrimethylen terephthalate (PTT), polyethylene naphthalate (PEN), and liquid crystalline polyesters; polyolefins such as polyethylene (PE), polypropylene (PP), and polybutylene; polyarylene sulfides such as polyoxymethylene (POM), polyamide (PA), and polyphenylene sulfide (PPS); fluorine-based resins such as polyketone (PK), polyether ketone (PEK), polyether ether ketone (PEEK), polyether ketone ketone (PEKK), polyether nitrile (PEN), and polytetrafluoroethylene; and liquid crystalline polymers (LCP). Amorphous ones include styrene based resins, polycarbonate (PC), polymethyl methacrylate (PMMA), polyvinyl chloride (PVC), polyphenylene ether (PPE), polyimide (PI), polyamide imide (PAI), polyether imide (PEI), polysulfone (PSU), polyether sulfone, and polyarylate (PAR); and others include phenolic resins, phenoxy resins, polystyrene based resins, polyolefin based resins, polyurethane based resins, polyester based resins, polyamide based resins, polybutadiene based resins, polyisoprene based resins, fluorine based resins, acrylonitrile based resins, and other thermoplastic elastomers, as well as copolymers and modifications thereof. Of these, polyolefins are preferred from the viewpoint of providing a lightweight porous body (a) and porous body (A); polyamides are preferred from the viewpoint of strength; amorphous resins such as polycarbonates and styrene based resins are preferred from the viewpoint of surface appearance; polyarylene sulfides are preferred from the viewpoint of heat resistance; polyether ether ketone is preferred from the viewpoint of continuous service temperature; and fluorine based resins are preferred from the viewpoint of chemical resistance.

In addition, the porous body (a) and the porous body (A) used for the present invention may contain, as resin components, an impact resistance improver such as elastomer and rubber component and other fillers and additives unless they impair the purposes of the present invention. Examples of the fillers and additives include inorganic filler, flame retardant, conductivity imparting agent, crystal nucleating agent, ultraviolet absorber, antioxidant, damping agent, antibacterial agent, coloring inhibitor, thermal stabilizer, release agent, antistatic agent, plasticizer, lubricant, colorant, pigment, dye, foaming agent, and coupling agent.

In addition, in the case where the porous body (a) and the porous body (A) contain reinforcing fibers (A-1) and thermoplastic resin (A-2), the thermoplastic resin (A-2) works as a binder to perform such functions as fixing the intersections of reinforcing fibers in the porous body (a), promoting the anchoring of the resin of the injection molded body into, and improving the mechanical properties of the porous body (a).

For producing the porous body (a) used for the present invention, the thermoplastic resin to be adopted may be in a form selected appropriately from the group consisting of sheet, film, nonwoven fabric, fiber, particle, and liquid. An appropriate form may be selected unless it impairs the mechanical properties of the molded product produced from the porous body (a) or any step of the process for producing the molded product.

It is preferable that the reinforcing fibers (A-1) present in the porous body (a) and the porous body (A) have a mass average fiber length of 1 to 15 mm because it serves to enhance the reinforcing efficiency of the reinforcing fibers and allows the porous body (a) to have good compression properties. If the reinforcing fibers has a mass average fiber length of 1 mm or more, it is preferred because voids in the porous body (a) can be formed efficiently to ensure a low apparent density, or in other words, it facilitates the adjustment of the porous body (a) to a desired thickness while maintaining a constant mass. If the reinforcing fibers have a mass average fiber length of 15 mm or less, it is preferable because the reinforcing fibers in the porous body (a) and the porous body (A) will not easily bend under their own weight and accordingly will not inhibit the development of compressive strength. The mass average fiber length of the reinforcing fibers (A-1) present in the porous body (a) and the porous body (A) can be determined as follows. The resin components in the porous body (a) or, in the case of the porous body (A), the resin components and the injection molded body (B) in the porous body are removed by an appropriate technique such as burning and elution, and 400 fibers are selected randomly from the remaining reinforcing fibers and subjected to length measurement with an accuracy of 10 μm, followed by calculating the mass average fiber length from the measured values. It is noted that the mass of each reinforcing fiber in the measurement sample used for calculating the mass average fiber length can be calculated approximately on the assumption that the cross section is constant in the length direction and that the mass is proportional to the sample length of the reinforcing fibers.

For the present invention, it is preferable for the porous body (a) to have voids in order to allow the porous body (a) to have an apparent density in the range of 0.05 to 0. 8 $g/cm^3$. Here, in the case where the porous body (a) contains reinforcing fibers and thermoplastic resin, for example, the term "voids" refer to those spaces formed by overlapping or crossing of reinforcing fibers that are coated with the thermoplastic resin and work as columnar supports. Voids thus formed are connected continuously to neighboring voids and accordingly the porous body is called an interconnected cell porous body. For example, a porous body (a) can be produced by heating a precursor of a porous body (a) prepared by impregnating reinforcing fibers with thermoplastic resin. In this case, as the thermoplastic resin is melted or softened by heating, the reinforcing fibers restrained in bent shapes at a plurality of positions are released at some of these positions to cause relaxation, or so-called spring-back, of bent reinforcing fibers, thereby leading to the formation of voids. This represents a preferred embodiment because the reinforcing fibers thus joined via thermoplastic resin have enhanced compression properties and serve to form a porous body (a) having a higher shape retainability.

In addition, in such a porous body (a) that contains voids, the volume content of the reinforcing fibers is preferably 0.5% by volume or more and 55% by volume or less; the volume content of the thermoplastic resin is preferably 2.5% by volume or more and 85% by volume or less; and the volume content of the voids is preferably 10% by volume or more and 97% by volume or less; relative to the total volume of the reinforcing fibers, thermoplastic resin, and voids, which accounts for 100% by volume.

In the porous body (a), it is preferable for the reinforcing fibers to have a volume content in the range of 0.5% by volume or more and 55% by volume or less in order to work effectively to reinforce the porous body (a) and reduce its weight. If the volume content of the reinforcing fibers is 0.5% by volume or more, it is preferable because it serves to realize a required reinforcing effect as a result of the existence of the reinforcing fiber. If the volume content of the reinforcing fibers is 55% by volume or less, on the other hand, it is preferable because the volume content of the thermoplastic resin will be relatively large compared with that of the reinforcing fibers so that the reinforcing fibers in the porous body (a) are joined to each other to allow the reinforcing fibers to work effectively for reinforcement, thereby allowing the porous body (a) to have good mechanical properties including compression properties. Similarly, from the viewpoint of compressive strength, it is more preferably in the range of 5% by volume or more and 30% by volume or less.

Furthermore, it is preferable that the volume content of the thermoplastic resin in the porous body (a) is in the range of 2.5% by volume or more and 85% by volume or less. If the volume content of the thermoplastic resin is 2.5% by volume or more, it is preferable because the reinforcing fibers in the porous body (a) will be joined to each other to allow the reinforcing fibers to work effectively for reinforcement, thereby allowing the porous body (a) to have good mechanical properties including compression strength. On the other hand, it is preferable that the volume content of the thermoplastic resin is 85% by volume or less because the formation of voids will not be inhibited. Similarly, from the viewpoint of not inhibiting the formation of voids, it is more preferably in the range of 25% by volume or more and 70% by volume or less.

Furthermore, it is preferable that the volume content of the voids in the porous body (a) is in the range of 10% by volume or more and 97% by volume or less. If the volume content of the voids is 10% by volume or more, it is preferable because the apparent density of the porous body (a) will be small enough to achieve a significant reduction in weight. On the other hand, if the volume content of the voids is 97% by volume or less, it is preferable because the reinforcing fibers will be restrained at a sufficient number of positions to allow the reinforcing fibers in the porous body (a) to work effectively for reinforcement, thereby ensuring an increased compressive strength. The volume content of the voids in the porous body (a) is more preferably in the range of 25% by volume or more and 85% by volume or less from the viewpoint of the balance between weight reduction and compressive strength.

The reinforcing fibers used for the present invention are preferably in the form of a nonwoven fabric from the viewpoint of ease of impregnation of the reinforcing fibers with resin. If the reinforcing fibers are in the form of a nonwoven fabric, it is preferable not only because nonwoven fabrics are easy to handle but also because impregnation with a thermoplastic resin may be performed easily although it is commonly high in viscosity. Here, a nonwoven fabric is composed mainly of strands and/or monofilaments of reinforcing fibers dispersed two dimensionally without regularity and examples include chopped strand mats, continuance strand mats, paper mats, carded mats, and air-laid mats (which will be hereinafter referred to collectively as reinforcing fiber mats).

Useful methods for producing a reinforcing fiber mat used to form the porous body (a) include, for example, a method in which reinforcing fibers are dispersed in a strand and/or substantially monofilament form and processed into a reinforcing fiber mat. Generally known techniques for producing reinforcing fiber mats include dry processes such as the air-laid technique in which reinforcing fibers are dispersed in an air stream and processed into a sheet and the carding technique in which reinforcing fibers are mechanically combed and shaped into a sheet, and wet processes such as the Radrite technique in which reinforcing fibers are stirred in water and processed into paper. For dry processes, useful means of processing reinforcing fibers into a more monofilament-like state include, for example, the installation of a fiber opening bar or a vibrating fiber opening bar and the use of a finer carding machine or faster rotating carding machine. For wet processes, useful means include, for example, adjusting the stirring conditions for reinforcing fibers, diluting the concentration of reinforcing fibers in the dispersion, adjusting the viscosity of the dispersion, and suppressing the vortex flows that can occur during transfer of the dispersion. In particular, reinforcing fiber mats are preferably produced by a wet process because the proportion of reinforcing fibers in the reinforcing fiber mat to be produced can be adjusted easily by, for example, increasing the concentration of fibers to be fed or adjusting the flow speed (flow rate) of the dispersion or the speed of the mesh conveyor. For example, decreasing the speed of the mesh conveyor relative to the flow rate of the dispersion may be preferred because the orientation of the fibers in the resulting reinforcing fiber mat will not be restrained in the take-up direction, making it possible to produce a bulky reinforcing fiber mat. Such a reinforcing fiber mat may be composed solely of reinforcing fibers, or may contain reinforcing fibers that are mixed with a powdery or fibrous matrix resin component. The reinforcing fibers may be mixed with an organic compound or an inorganic compound, or the reinforcing fibers may be fixed to each other by a resin component.

Furthermore, the reinforcing fiber mat may be previously impregnated with a resin to use as a precursor of the porous body (a). From the viewpoint of ease of production, a preferred method for producing a precursor of the porous body (a) is to apply a pressure to a reinforcing fiber mat that is heated at a temperature equal to or above the melting or softening temperature of the resin and impregnate the reinforcing fiber mat. More specifically, a preferred technique, for example, is to attach resin layers to both sides of a reinforcing fiber mat to produce a layered structure and melt the resin to carry out impregnation.

Useful facilities for carrying out the above methods include compression molding machine and double belt press. A production process incorporating a compression molding machine will be of a batch type, and this is preferred because an improved productivity can be achieved by using an intermittent type press system having two or more parallel machines for heating and cooling. A production process incorporating a double belt press will be of a continuous type, and this is preferred because continuous processing can be performed easily to ensure a high continuous production efficiency.

[Molding Material (b)]

An appropriate molding material (b) is adopted for the present invention taking into consideration the easiness of fusion with the porous body (a), the surface appearance of the intended molded product, and the easiness of forming its shape. As the molding material (b), an injection molding material based on a thermoplastic resin can be used suitably. Furthermore, since the molding material (b) can be integrated with the porous body (a) by forming an anchoring structure together, it may be good to use the same resin as in the porous body (a) or select an appropriate one from other thermoplastic resins. Furthermore, the thermoplastic resin in the molding material (b) may contain a filler, and from the viewpoint of providing a molded product having an improved strength, preferred fillers include carbon fiber and glass fiber.

[Production Method]

The method for producing the molded product according to the present invention is described below. The method for producing the molded product according to the present invention includes a step for inserting a porous body (a) into a mold cavity, a step for closing the mold, an injection molding step for injecting a molten molding material (b) containing a thermoplastic resin, and a molding step for shaping the material resulting from the foregoing injection molding step. In the step for inserting a porous body (a) into a mold cavity, it is preferable to insert the porous body (a) into the mold that has been adjusted to an appropriate temperature. It is noted that hereinafter the step for inserting a porous body (a) into a mold cavity is occasionally referred to as the insertion step. In the step for closing the mold, it is preferable that a mold cavity is formed by closing the mold, which has at least a fixed member and a movable member, by a mold closing operation. The molded product can be produced by carrying out these steps in this order.

Here, the insertion step is intended for feeding and disposing the porous body (a) in the mold cavity. FIGS. 3 and 4 show examples of the insertion step. In the insertion step, it is preferable that the porous body (a) 11 is positioned by a holding member having either a needle mechanism (numbered 13 in FIG. 4) or a mechanical clamping mechanism (numbered 10 in FIG. 3) because the porous body (a) 11 can be disposed at a desired position. These methods are preferred also because the porous body (a) 11 is prevented from moving (shifting) inside the mold 9 under the pressure caused by the molding material (b) that is injection-molded in the subsequent injection molding step, thereby allowing the molded product to be covered by the molding material (b) with high accuracy.

The holding member is described in more detail below. The needle mechanism has a plurality of needles that pierce the porous body (a) so that the porous body (a) is fixed at an intended position. The mechanical clamping mechanism has a plurality of mechanical clamps that holds the porous body (a) to fix it at an intended position. These mechanisms may be located at an appropriate position that is identified taking into account the fixability of the porous body (a) and the structure of the mold. As shown in FIG. 3, it may be held from the upper and lower sides of the mold (8 and 9), or as shown in FIG. 4, it may be held from a lateral side of the mold (8 and 9). Furthermore, from the viewpoint of simplicity and precision of the facility, it is also preferable for these mechanisms to have springs to adjust the holding force. Of these, the mechanical clamping mechanism is preferred from the viewpoint of the holding accuracy. In addition, from the viewpoint of production, it is preferable for these mechanisms to be attached to an articulated robot or a rail-like conveying robot.

The holding member described above serves to dispose the porous body (a) in the mold cavity, close the mold, and then perform the injection molding step.

In the injection molding step, the molding material (b) is melted and injected into the porous body (a) to achieve their integration. The application of injection molding in order to achieve integration is preferred from the viewpoint of productivity of the molded product and ease of adjusting the thickness of the injection molded body (B). In the injection molding step, the injection pressure used to inject the molding material (b) in a molten state is preferably 30 MPa or more from the viewpoint of the ease of adjusting the thickness of the injection molded body (B) and the ease of fusion with the porous body (a). An appropriate injection molding pressure may be set depending on the size of the product and the melt viscosity of the molding material (b), but it is more preferably 80 MPa or more from the viewpoint of covering the porous body (a) with the molding material (b) in a molten state. Here, whether or not the molding material (b) is in a molten state is determined based on various values determined according to the following standards. In the case where the thermoplastic resin in the molding material (b) is a crystalline thermoplastic resin, it is determined based on whether or not the actual temperature of the molding material (b) has reached the melting point of the molding material (b) measured according to JIS K7120 (1987), and in the case where the thermoplastic resin in the molding material (b) is an amorphous resin, it is determined based on whether or not the actual temperature of the molding material (b) has reached the temperature that is higher by 100° C. than the Vicat softening temperature of the molding material (b) measured according to JIS K7206 (1999).

If the molding material (b) is in a molten state, that is, heated at or above the temperatures specified above for various material types, the thermoplastic resin in the porous body (a) and the thermoplastic resin in the molding material (b) are integrated during the injection molding step. In the process of integration, as outlined above, a molding material (b) in a molten state is injection-molded and brought into contact with a porous body (a) or an adhesive layer disposed thereon to form a structure in which the porous body (A) and the injection molded body (B) are integrated to form a molded product, thus leading to a molded product having high shape stability. To improve the molded product, furthermore, the resulting molded product can be provided with surface properties characteristic of injection molded bodies.

In the injection molding step, the temperature of the mold is preferably lower by 40° C. to 120° C. than the melting point of the thermoplastic resin in the porous body (a) because it ensures a good balance between the solidification rate of the molding material (b) and the productivity. It is more preferably lower by 60° C. to 120° C. than the melting point of the thermoplastic resin from the viewpoint of the solidification rate of the thermoplastic resin and the speed of its flowing around the porous body (a), which is related with the demolding of the molded product. The range may be between either of the aforementioned upper limits and either of the aforementioned lower limits.

Examples of the molded product and the production method according to the present invention include electric and electronic device components such as housing of PCs, displays, OA devices, video cameras, optical devices, audio devices, air conditioners, lighting devices, amusement articles, toy goods, and other home appliances, as well as trays, chassis, interior members, and cases thereof; structural components of automobiles and motorcycles including bearings and beams of various members, various frames, various hinges, various arms, various axles, and various wheels, exterior panels and body components of hoods, roofs, doors, fenders, trunk lids, side panels, rear end panels, front bodies, underbodies, various pillars, various members, various frames, various beams, various supports, various rails, and various hinges, exterior components such as bumpers, bumper beams, molds, undercovers, engine covers, rectifiers, spoilers, cowl louvers, and aero parts, interior components such as instrument panels, seat frames, door trims, pillar trims, steering wheels, and various modules; automobile and motorcycle parts such as battery trays, headlamp supports, pedal housing, protectors, lamp reflectors, lamp housing, noise shields, and spare tire covers; and aircraft components such as landing gear pods, winglets, spoilers, edges, rudders, elevators, fairings, ribs, and seats. From the viewpoint of mechanical properties, they are suitably used for interior and exterior components of automobiles, electrical and electronic equipment housing, bicycles, structural members of sports goods, interior components of aircraft, and boxes for transportation. In particular, they are suitably used as materials for module members composed of a plurality of components, and as production methods therefor.

EXAMPLES

The present invention is described below in more detail with reference to examples. It is noted, however, that the present invention is not considered limited to these examples.

[Methods for Evaluation and Measurement]

(1) Mass Average Fiber Length of Reinforcing Fibers in the Porous Body (a)

A test piece having a length of 50 mm and a width of 50 mm was cut out of the porous body (a) and heated at 500° C. in air for 30 minutes to burn off the resin component. The reinforcing fibers that remained were scattered on filter paper to serve as a specimen. The specimen was magnified 200 times under a laser microscope (VK-9510, manufactured by Keyence Corporation), and 400 fibers were selected to measure their length. The mass average fiber length ($L_w$) was calculated from the measurements by the following equation.

$$\text{Mass average fiber length } (L_w) \text{ of reinforcing fibers } (A\text{-}1) = \Sigma(Li \times Wi/100)$$

Li: measured fiber length (i=1, 2, 3, . . . , n)

Wi: Mass fraction of reinforcing fibers (A-1) having a fiber length of Li (i =1,2,3, . . . ,n)

(2) Volume Content of Reinforcing Fibers in the Porous Body (a)

A test piece having a length of 10 mm and a width of 10 mm was cut out of the porous body (a) and the mass Ws and the apparent volume Vs of the porous body (a) were measured. Then, the test piece was heated at 500° C. in air for 30 minutes to burn off the resin component, and the mass Wf of the reinforcing fibers that remained was measured and used for calculation by the following equation.

$$Vf(\text{vol \%}) \text{ of reinforcing fibers}=(Wf/\rho f)/\{Wf/\rho f+(Ws-Wf)/\rho r\}/Vs \times 100$$

$\rho f$: density of reinforcing fibers (g/cm$^3$)
$\rho r$: density of resin (g/cm$^3$)
Vs: apparent volume of porous body (a) (cm$^3$)

(3) Volume Content of Voids in the Porous Body (a)

A test piece having a length of 10 mm and a width of 10 mm was cut out of the porous body (a) and its cross section was observed by scanning electron microscopy (SEM). Ten portions aligned at equal intervals from the surface of the porous body (a) were photographed at a magnification of 1,000 times. In each of the images, the portions other than those representing the cross sections of the materials constituting the porous body (a) in the image were defined as voids, and the area $A_a$ of the voids was determined. Then, the void rate was calculated by dividing the area $A_a$ of the voids by the total area of the image. To determine the volume content of voids in the porous body (a), five test pieces were prepared and 10 portions in each test piece were photographed, followed by calculating the arithmetic average void ratio over the 50 portions in total.

(4) Volume Content of Resin in the Porous Body (a)

From the volume content of reinforcing fibers and the volume content of voids in the porous body (a) determined in paragraphs (2) and (3), the volume content of resin was calculated by the following equation.

$$\text{Volume content of resin } Vr \text{ (vol \%)}=100-(Vf+Va)$$

Vf: volume content of reinforcing fibers (vol %)
Va: volume content of voids (vol %)

(5) Apparent Density of Porous Body (a) and Porous Body (A)

Test pieces were cut out of the porous body (a) and the porous body (A) in the molded product, and their apparent density was measured according to JIS K7222 (2005). Each test piece had a length of 20 mm and a width of 20 mm. The length, width, and thickness of each test piece were measured with a micrometer, and the volume V of the test piece was calculated from the measurements taken. In addition, the mass M of each test piece prepared was measured with an electronic balance. The apparent density $\rho a$ of the porous body (a) was calculated by the following equation from the mass M and volume V obtained above. Here, for the porous body (A), the injection molding material present at the surface was cut out and the through-thickness center portion of the porous body (A) was taken as a specimen by removing the portion that accounts for 20% or more of the thickness measured from the interface where it is in contact with the injection molded body (B) towards the center, and its apparent density $\rho A$ was measured as in the case of the porous body (a).

$$\rho_a, \rho_A \text{ [g/cm}^3]=10^3 \times M \text{ [g]}/V\text{[mm}^3]$$

(6) Compressive Strength at 10% Compression of the Porous Body (a)

A test piece was cut out of the porous body (a), and the compression properties of the porous body (a) were measured according to ISO844 (2004). Each test piece was cut to a length of 25 mm and a width of 25 mm. The compression properties of the test piece prepared above were examined using a universal tester. At this time, the compressive strength $\sigma_m$ was calculated by the following equation from the maximum force $F_m$ reached at a deformation rate of 10% and the bottom cross-sectional area $A_0$ of the test piece measured before the test. The measuring instrument used was a Instron (registered trademark) 5565 type universal testing machine (manufactured by Instron Japan Co., Ltd.).

$$\sigma_m \text{ [MPa]}=10^3 \times F_m \text{ [N]}/A_0 \text{ [mm}^2\text{]}$$

(7) Pore Shape of the Porous Body (a)

A test piece having a length of 10 mm and a width of 10 mm was cut out of the porous body (a). The test piece was further divided equally into five parts aligned in the length direction. The cross section of each part was observed by scanning electron microscopy (SEM) and ten portions were photographed at a magnification of 1000 times. In the image obtained, the number of voids where the pores in the cross-sectional view were filled with the resin, i.e., pores closed by the film material, and the number of open voids formed among reinforcing fibers surrounded by the resin were measured, and a porous body in which voids in the form of open pores accounted for 50% or more was judged to be an interconnected cell porous body.

(8) Percent Change in Apparent Density Between Porous Body (a) and Porous Body (A)

The percent change was determined from the apparent density of the porous body (a) and that of the porous body (A) measured in paragraph (2) above. It is noted that in the equation given below and Tables 3 and 4, the percent change in apparent density between the porous body (a) and the porous body (A) is referred simply as percent change in apparent density.

$$\text{Percent change in apparent density [\%]} = \{(\text{apparent density of porous body }(A) - \text{apparent density of porous body }(a))/\text{apparent density of porous body }(a)\} \times 100$$

(9) Thickness of the Porous Body (A) and the Injection Molded Body (B)

The thickness of the molded product was measured with a caliper gauge. A small piece was cut out of this measured portion. The cross section of this small piece was examined to determine the thickness of the porous body (A) and the injection molded body (B). In the thickness measurement based on cross-sectional observation, the length (L1) in the perpendicular direction to the plane (observation surface), which was parallel to the thickness direction of the small piece, was measured in advance with a micrometer. Subsequently, the small piece was embedded in an epoxy resin, and polished in such a manner that a cross section parallel to the thickness direction was exposed to serve as observation surface, thereby preparing a specimen.

The specimen was magnified 200 times under a laser microscope (VK-9510, manufactured by Keyence Corporation) to observe the cross section, and the photographed image was examined using general purpose image analysis software to determine the thickness of the porous body (A) and the injection molded body (B) at equally spaced 10 positions using a program incorporated in the software, followed by determining the average thickness of the porous body (A) and that of the injection molded body (B) by calculating their arithmetic averages. In addition, the smallest of the thickness measurements of the porous body (A) and the largest of the thickness measurements of the injection molded body (B) were taken to represent the minimum thickness of the porous body (A) and the maximum thickness of the injection molded body (B).

(10) Rate of Coverage by the Injection Molded Body (B) in the Molded Product

The projected area (S1) of the molded product was magnified 10 times under a laser microscope (VK-9510, manufactured by Keyence Corporation) and the photographed image was examined using general purpose image analysis software to determine the total area (S1) of the molded product using a program incorporated in the software. Then, in the observed surface, the area (S2) of the portions where the porous body (A) was exposed out of the molded product was measured similarly using a laser microscope. The rate of coverage by the injection molded body was calculated by the following equation.

$$\text{Rate of coverage by injection molded body (\%)} = S2/S1 \times 100$$

(11) Joining State and Anchoring Depth of the Injection Molded Body (B) in the Molded Product A small piece having a width of 10 mm and a length of 10 mm was cut out of the molded product, embedded in an epoxy resin, and polished in such a manner that a cross section perpendicular to the thickness direction of the molded product was exposed to serve as an observation surface, thereby preparing a specimen. The sample is magnified 200 times under a laser microscope (VK-9510, manufactured by Keyence Corporation), and 10 positions where the fields of view did not overlap were randomly selected and photographed. In the photographed image, the boundary layer between the thermoplastic resin constituting the porous body (A) and the thermoplastic resin constituting the injection molded body (B) was observed and the difference in brightness between the resins was confirmed. They were judged to be in a fused state if a boundary showing difference in brightness was not seen in the boundary layer between the resin constituting the porous body (A) and the resin constituting the injection molded body (B). In each of the 10 fields of view photographed above, the irregularities in the boundary are examined to determine the vertical drop between the deepest valley and the highest peak, which is referred to as maximum vertical drop dmax, and the vertical drop between the shallowest valley and the lowest peak, which is referred to as minimum vertical drop dmin. Of the 10 dmax values obtained from these fields of view, the largest one was defined as the maximum height Ry (μm) in the irregularities in the boundary layer. In addition, from the dmax and dmin values obtained above, the average roughness Rz over the irregularities in the boundary layer, which was defined as anchoring depth, was calculated by the following equation.

$$Rz \text{ (}\mu m\text{)} = \Sigma(di \text{ max} + di \text{ min})/2n$$

dimax: maximum vertical drop (μm) in each field (i=1, 2, . . . 10)

dimin: minimum vertical drop (μm) in each field (i=1, 2, . . . 10)

n: number of fields of view observed

(12) Melting Point of Injection Molded Body

The melting point was determined by differential scanning calorimetry (DSC). A closed sample container filled with 5 mg of a specimen was heated from a temperature of 30° C. to a temperature of 300° C. at a heating rate of 10° C./min, and then evaluated. The evaluation device used was Pyrisl DSC manufactured by Perkin Elmer.

For a specimen whose melting point was difficult to determine (for example, in the case where the thermoplastic resin in the molding material (b) was an amorphous resin showing no melting point), the Vicat softening temperature was determined according to ISO306 (2004) (using a weight of 10 N) to represent its softening point.

[Carbon Fiber]

A copolymer containing polyacrylonitrile as primary component was spun, calcined, and subjected to surface oxidation treatment to produce a continuous carbon fiber material containing a total of 12,000 single filaments. This continuous carbon fiber material had characteristics as given below.

Specific gravity: 1.8
Tensile strength: 4,600 MPa
Tensile modulus of elasticity: 220 GPa
Tensile elongation at break: 2.1%

[PP Resin]

A resin sheet with a metsuke of 200 g/m² containing 80% by mass of an unmodified polypropylene resin (Prime Polypro (registered trademark) J105G, manufactured by Prime Polymer Co., Ltd.) and 20% by mass of an acid-modified polypropylene resin (Admer QB510, manufactured by Mitsui Chemicals, Inc.) was prepared. Characteristics of the resulting resin sheet are shown in Table 1.

[PA6 Resin]

A resin sheet of a Nylon 6 resin (Amilan (registered trademark) CM1021T, manufactured by Toray Industries, Inc.) with a metsuke of 226 g/m² was prepared. Characteristics of the resulting resin film are shown in Table 1.

[PPS Resin]

A resin sheet of polyphenylene sulfide resin (Torelina (registered trademark) A900, manufactured by Toray Industries, Inc.) with a metsuke of 268 g/m² was prepared. Characteristics of the resulting resin sheet are shown in Table 1.

[Porous Body F-1]

Carbon fibers were used as reinforcing fibers and chopped carbon fibers were prepared by cutting them to 5 mm with a cartridge cutter. Water and a surface active agent (polyoxyethylene lauryl ether (trade name), manufactured by Nacalai Tesque, Inc.) were mixed to prepare a dispersion liquid with a concentration of 0.1 wt %, and this dispersion liquid was used with the chopped carbon fibers to prepare reinforcing fiber mats. The production apparatus to be used has a cylindrical container with a diameter of 1,000 mm equipped with an outlet cock at the bottom of the container, which serves as dispersion vessel, and a linear transportation member (inclination angle 30°) connecting the dispersion vessel and a papermaking tank. The dispersion vessel is equipped with a stirrer attached at the top opening and the chopped carbon fibers and dispersion liquid (dispersion medium) can be fed through the opening. The papermaking tank is equipped with a mesh conveyor that has a papermaking face with a width of 500 mm at the bottom and a conveyor that can transport a carbon fiber mat is connected to the mesh conveyor. Papermaking operations were carried out using a dispersion liquid with a carbon fiber concentration of 0.05 mass %. The resulting carbon fiber mat was dried in a drying furnace at 200° C. for 30 minutes to provide a reinforcing fiber mat. The resulting mat had a metsuke of 90 g/m².

Next, layers of the reinforcing fiber mat and PP resin were stacked in the order of [PP resin/reinforcing fiber mat/reinforcing fiber mat/PP resin] to provide a layer stack. Then, the following steps (I) to (IX) were carried out in this order to prepare a porous body F-1.

(I) The layer stack was put in the cavity of a mold for press molding preheated at 200° C. and close it.

(II) After holding the state for 120 seconds, a pressure of 3 MPa was applied for 60 seconds.

(III) While maintaining the pressure, the cavity temperature was decreased to 50° C.

(IV) The mold was opened, and the precursor of the porous body (a) was taken out.

(V) Six layers of the precursor of the porous body (a) were put one on top of another in the cavity of the mold for press molding preheated at 230° C., and the mold was closed.

(VI) After holding the state for 300 seconds, a pressure of 1 MPa was applied for 60 seconds.

(VII) After step (VI), the mold cavity was opened, and a metal spacer was inserted in the end thereof to adjust the thickness so that the resulting porous body (a) would have a thickness of 9 mm.

(VIII) Then again, the mold cavity was closed, and while maintaining the pressure, the cavity temperature was decreased to 50° C.

(IX) The mold was opened and the porous body (a) was taken out.

Its characteristics are given in Table 1.

[Porous Body F-2]

Carbon fibers were used as reinforcing fibers, and except for cutting them to 8 mm with a cartridge cutter, the same procedure as for porous body F-1 was carried out to prepare reinforcing fiber mats and produce a layer stack.

Then, the following steps (I) to (IX) were carried out in this order to prepare a porous body F-2. Steps (I) to (IV), (VI), (VIII), and (IX): same as for F-1

(V) Four layers of the precursor of the porous body (a) were put one on top of another in the cavity of the mold for press molding preheated at 230° C., and the mold was closed.

(VII) After step (VI), the mold cavity was opened, and a metal spacer was inserted in the end thereof to adjust the thickness so that the resulting porous body (a) would have a thickness of 10 mm.

Its characteristics are given in Table 1.

[Porous Body F-3]

Carbon fibers were used as reinforcing fibers, and except for cutting them to 15 mm with a cartridge cutter, the same procedure as for porous body F-1 was carried out to prepare reinforcing fiber mats and produce a layer stack. Then, the following steps (I) to (IX) were carried out in this order to prepare a porous body F-3.

Steps (I) to (IV) and (VI) to (IX): same as for F-2

(V) Two layers of the precursor of the porous body (a) were put one on top of another in the cavity of the mold for press molding preheated at 230° C., and the mold was closed. Its characteristics are given in Table 1.

[Porous Body F-4]

Carbon fibers were used as reinforcing fibers, and except for cutting them to 8 mm with a cartridge cutter, the same procedure as for porous body F-1 was carried out to prepare reinforcing fiber mats and produce a layer stack. Next, layers of the reinforcing fiber mat and PA6 resin were stacked in the order of [PA6 resin/reinforcing fiber mat/reinforcing fiber mat/PA6 resin] to provide a layer stack. Then, the following steps (I) to (IX) were carried out in this order to prepare a porous body F-4.

Steps (II) to (IV), (VI), (VIII), and (IX): same as for F-1

(I) The layer stack was put in the cavity of a mold for press molding preheated at 240° C. and close it.

(V) Eight layers of the precursor of the porous body (a) were put one on top of another in the cavity of the mold for press molding preheated at 240° C., and the mold was closed.

(VII) After step (VI), the mold cavity was opened, and a metal spacer was inserted in the end thereof to adjust the thickness so that the resulting porous body (a) would have a thickness of 20 mm.

Its characteristics are given in Table 1.

[Porous Body F-5]

Except for using PPS resin instead of PA6 resin, the same procedure as for F-4 was carried out to prepare reinforcing fiber mats and produce a layer stack. Then, the following steps (I) to (IX) were carried out in this order to prepare a porous body F-5.

Steps (II) to (IV), (VI), (VIII), and (IX): same as for F-1

(I) The layer stack was put in the cavity of a mold for press molding preheated at 320° C. and close it.

(V) Two layers of the precursor of the porous body (a) were put one on top of another in the cavity of the mold for press molding preheated at 320° C., and the mold was closed.

(VII) After step (VI), the mold cavity was opened, and a metal spacer was inserted in the end thereof to adjust the thickness so that the resulting porous body (a) would have a thickness of 5 mm.

Its characteristics are given in Table 1.

[Porous Body F-6]

Polymethacrylimide (PMI) resin foam (Rohacell (registered trademark) 110IG-F, manufactured by Evonik Industries) was used.

Its characteristics are given in Table 1.

[Porous Body F-7]

The same procedure as for porous body F-1 was carried out to prepare reinforcing fiber mats and produce a layer stack. Then, the following steps (I) to (IX) were carried out in this order to prepare a porous body F-7.

Steps (I) to (IV) and (VI) to (IX): same as for F-2

(V) A total of 20 layers of the precursor of the porous body (a) were put one on top of another in the cavity of the mold for press molding preheated at 230° C., and the mold was closed.

Its characteristics are given in Table 1. It is noted that although porous body F-7 does not contain voids, it is referred to as "porous body F-7" for convenience.

[Porous Body F-8]

Polymethacrylimide (PMI) resin foam (Rohacell (registered trademark) 31IG-F, manufactured by Evonik Industries) was used.

Its characteristics are given in Table 1.

[Injection Molding Material S-1]

Carbon fiber reinforced polypropylene resin (Torayca (registered trademark) TLP8169, manufactured by Toray Industries, Inc.) was used. It had a density of 1.06 g/cm³. Its characteristics are given in Table 2.

[Injection Molding Resin S-2]

Carbon fiber reinforced nylon 6 resin (Torayca (registered trademark) TLP1060, manufactured by Toray Industries, Inc.) was used. It had a density of 1.26 g/cm³. Its characteristics are given in Table 2.

[Injection Molding Material S-3]

Carbon fiber reinforced polyphenylene sulfide resin (Torelina (registered trademark) A630T-30V, manufactured by Toray Industries, Inc.) was used. It had a density of 1.46 g/cm³. Its characteristics are given in Table 2.

[Injection Molding Material S-4]

A mixture of 80% by mass of an unmodified polypropylene resin (Prime Polypro (registered trademark) J105G, manufactured by Prime Polymer Co., Ltd.) and 20% by mass of an acid-modified polypropylene resin (Admer QB510, manufactured by Mitsui Chemicals, Inc.) was kneaded in a twin screw extruder (TEX-30α, manufactured by Japan Steel Works, Ltd), and resin pellets were prepared and used. It had a density of 0.92 g/cm³. Its characteristics are given in Table 2.

[Injection Molding Material S-5]

Glass fiber reinforced polycarbonate resin (Panlite (registered trademark) G-3430R, manufactured by Teijin Limited) was used. It had a density of 1.43 g/cm³.

Its characteristics are given in Table 2.

Examples and Comparative examples are given below. Samples produced in the Examples and Comparative example had the shape shown in FIG. 2. Here, a mold having an appropriate cavity size was used to fit the porous body (a) used.

EXAMPLE 1

F-1 was used as the porous body (a) and S-1 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 11 mm) mounted on an injection molding machine (J150EII-P, manufactured by Japan Steel Works, Ltd) and subjected to insert molding at a barrel temperature of 220° C., a mold temperature of 50° C., and an injection molding pressure of 100 MPa to provide a molded product (FIG. 1). The appearance of the resulting molded product was free of molding defects such as sink marks. Other evaluation results are summarized in Table 3.

EXAMPLE 2

F-2 was used as the porous body (a) and S-1 was used as the injection molding material (b). The porous body (a) was first cut to a length of 20 mm and a width of 200 mm and processed to serve as a core for insert molding.

Next, the porous body (a) was positioned by a needle mechanism in a mold for injection molding (cavity thickness: 12 mm) mounted on an injection molding machine and subjected to insert molding at a barrel temperature of 220° C., a mold temperature of 50° C., and an injection molding pressure of 100 MPa to provide a molded product. The appearance of the resulting molded product was free of molding defects such as sink marks. Other evaluation results are summarized in Table 3.

EXAMPLE 3

F-3 was used as the porous body (a) and S-4 was used as the injection molding material (b). The porous body (a) was first cut to a length of 20 mm and a width of 200 mm and processed to serve as a core for insert molding.

Next, the porous body (a) was positioned by a needle mechanism in a mold for injection molding (cavity thickness: 12 mm) mounted on an injection molding machine and subjected to insert molding at a barrel temperature of 220° C., a mold temperature of 50° C., and an injection molding pressure of 100 MPa to provide a molded product. The appearance of the resulting molded product was free of molding defects such as sink marks. Other evaluation results are summarized in Table 3.

EXAMPLE 4

F-4 was used as the porous body (a) and S-2 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 21 mm) mounted on an injection molding machine and subjected to insert molding at a barrel temperature of 260° C., a mold temperature of 80° C., and an injection molding pressure of 80 MPa to provide a molded product. The appearance of the resulting molded product was free of molding defects such as sink marks. Other evaluation results are summarized in Table 3.

EXAMPLE 5

F-5 was used as the porous body (a) and S-3 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 6 mm) mounted on an injection molding machine and subjected to insert molding at a barrel temperature of 320° C., a mold temperature of 150° C., and an injection molding pressure of 130 MPa to provide a molded product. The appearance of the resulting molded product was free of molding defects such as sink marks. Other evaluation results are summarized in Table 3.

EXAMPLE 6

F-6 was used as the porous body (a) and S-1 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 12 mm) mounted on an injection molding machine and subjected to insert molding at a barrel temperature of 220° C., a mold temperature of 50° C., and an injection molding pressure of 100 MPa to provide a molded product. The appearance of the resulting molded product suffered some molding defects such as sink marks, but they were not practically significant. Other evaluation results are summarized in Table 3.

EXAMPLE 7

F-8 was used as the porous body (a) and S-1 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 14 mm) mounted on an injection molding machine and subjected to insert molding at a barrel temperature of 220° C., a mold temperature of 30° C., and an injection molding pressure of 100 MPa to provide a molded product. The appearance of the resulting molded product suffered some sink marks, but the porous body (a) served effectively to produce a lightweight molded product. Other evaluation results are summarized in Table 3.

EXAMPLE 8

F-8 was used as the porous body (a) and S-1 was used as the injection molding material (b). The porous body (a) was first cut to a length of 20 mm and a width of 200 mm and processed to serve as a core for insert molding.

Next, without using a porous body (a) positioning mechanism, the porous body (a) was put in a mold for injection molding (cavity thickness: 14 mm) mounted on an injection molding machine and subjected to insert molding at a barrel temperature of 220° C., a mold temperature of 50° C., and an injection molding pressure of 100 MPa to provide a molded product. The appearance of the resulting molded product suffered some sink marks, but the porous body (a) served effectively to produce a lightweight molded product. Other evaluation results are summarized in Table 3.

EXAMPLE 9

F-1 was used as the porous body (a) and S-5 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 11 mm) mounted on an injection molding machine and subjected to insert molding at a barrel temperature of 300° C., a mold temperature of 70° C., and an injection molding pressure of 100 MPa to provide a molded product. The appearance of the resulting molded product was free of molding defects such as sink marks. Other evaluation results are summarized in Table 3.

COMPARATIVE EXAMPLE 1

F-7 was used as the porous body (a) and S-1 was used as the injection molding material (b). The porous body (a) was first cut to a length of 20 mm and a width of 200 mm and processed to serve as a core for insert molding.

Next, the porous body (a) was positioned by a mechanical clamping mechanism in a mold for injection molding (cavity thickness: 22 mm) mounted on an injection molding machine and subjected to insert molding at a barrel temperature of 220° C., a mold temperature of 50° C., and an injection molding pressure of 100 MPa to provide a molded product. Although the appearance of the resulting molded product was free of molding defects such as sink marks, the molded product was too heavy to serve in a practically acceptable manner. Other evaluation results are summarized in Table 4.

[Consideration]

Results obtained in the Examples show that in Examples 1 to 6 and 9, each using a porous body (a) falling within the scope of the present invention, the injection molded body (B) was integrated on the surface of the porous body (A) to provide a molded product that was free of sink marks, which represent drawbacks peculiar to injection molded bodies, and high in dimensional stability. It is also found that as seen in Examples 1 to 6 and 9, the fact that the average thickness (tA) of the porous body (A) and the average thickness (tB) of the injection molded body (B) meet the relation tA≥3×tB allows a thick injection molded body to be molded without forming sink marks. Furthermore, at the joining face between the porous body (A) and the injection molded body (B), they are joined to each other by the molding material (b) in a molten state to allow their matrix resins to be fused together, and the use of a porous body (a) falling within the scope of the present invention permits effective functioning of anchoring and elimination of defects such as separation between the porous body and the injection molded body. As regards the production of a lightweight molded product, the porous body (a) that has an apparent density of 0.05 to 0.8 g/cm$^3$ and has a compressive strength at 10% compression of 1.5 MPa or more as determined according to ISO844 (2004) serves to realize weight reduction while maintaining a desired shape, and the fact that at least one surface is covered serves to produce a thick molded product compared to the use of a conventional injection molded body, thereby also ensuring an increased stiffness. In Comparative example 1, on the other hand, the use of a porous body (a) substantially free of voids resulted in a molded product having a large weight. In Examples 7 and 8, furthermore, a change in the size of the porous body (a) led to a molded product partially suffering sink marks, resulting in an inferior appearance compared with Examples 1 to 6 and 9, but a very lightweight molded product was obtained.

As described above, it has been confirmed that the molded product according to the present invention has good lightweight properties, high stiffness, and good product surface appearance, and the method for the production thereof serves to produce a molded product having good surface properties.

TABLE 1

Porous body (a)

| | unit | F-1 | F-2 | F-3 | F-4 |
|---|---|---|---|---|---|
| reinforcing fiber (A-1) type | | carbon fiber | carbon fiber | carbon fiber | carbon fiber |
| fiber length | mm | 5 | 8 | 15 | 8 |
| thermoplastic resin (A-2) type | | PP | PP | PP | PA6 |
| fiber opening state | | monofilament | monofilament | monofilament | monofilament |
| fiber dispersion state | | random | random | random | random |
| volume content of (A-1) | vol % | 6.7 | 4.0 | 2.0 | 4.0 |
| volume content of (A-2) | vol % | 26.6 | 16.0 | 8.0 | 16.0 |
| volume content of voids | vol % | 66.7 | 80.0 | 90.0 | 80.0 |
| apparent density of porous body (a) | g/cm$^3$ | 0.36 | 0.22 | 0.11 | 0.25 |
| pore shape of porous body (a) | continuous or independent | continuous | continuous | continuous | continuous |
| 10% compression strength of porous body (a) | MPa | 6 | 2 | 1.5 | 2.5 |

| | unit | F-5 | F-6 | F-7 | F-8 |
|---|---|---|---|---|---|
| reinforcing fiber (A-1) type | | carbon fiber | absent | carbon fiber | absent |
| fiber length | mm | 8 | — | 5 | — |
| thermoplastic resin (A-2) type | | PPS | PMI | PP | PMI |
| fiber opening state | | monofilament | — | monofilament | — |
| fiber dispersion state | | random | — | random | — |
| volume content of (A-1) | vol % | 4.0 | — | 20.0 | — |
| volume content of (A-2) | vol % | 16.0 | 8.0 | 80.0 | 2.6 |
| volume content of voids | vol % | 80.0 | 92.0 | 0.0 | 97.4 |
| apparent density of porous body (a) | g/cm$^3$ | 0.29 | 0.11 | 1.08 | 0.03 |
| pore shape of porous body (a) | continuous or independent | continuous | continuous | independent | no voids | independent |
| 10% compression strength of porous body (a) | MPa | 3 | 3 | unmeasurable | 0.4 |

TABLE 2

Injection molding material (b)

| | unit | S-1 | S-2 | S-3 | S-4 | S-5 |
|---|---|---|---|---|---|---|
| reinforcing fiber type | | carbon fiber | carbon fiber | carbon fiber | absent | glass fiber |
| volume content of reinforcing fiber | vol % | 18 | 21 | 24.5 | — | 16.5 |
| matrix resin type | | polypropylene | polyamide 6 | polyphenylene sulfide | polypropylene | polycarbonate |
| volume content of matrix resin | vol % | 82 | 79 | 75.5 | 100 | 83.5 |

TABLE 3

| | | unit | Example 1 | Example 2 | Example 3 | Example 4 | Example 5 |
|---|---|---|---|---|---|---|---|
| Molded Product | porous body (a) | — | F-1 | F-2 | F-3 | F-4 | F-5 |
| | injection molding material (b) | — | S-1 | S-1 | S-4 | S-2 | S-3 |
| | percent change in apparent density | % | 3 | 7 | 10 | 7 | 7 |
| | depth of anchoring of (b) in (a) | μm | 50 | 60 | 70 | 60 | 60 |
| | thickness of (A) | mm | 9 | 10 | 10 | 20 | 5 |
| | thickness of (B) | mm | 1 | 1 | 1 | 0.5 | 0.5 |
| | rate of coverage by injection molded body (A)/(B) | % | 95 | 80 | 98 | 98 | 98 |
| | form of joining | | fusion | existent | existent | existent | existent |
| Production Method | insertion | existent or absent | existent | existent | existent | existent | existent |
| | holding member | existent or absent | existent | existent | existent | existent | existent |
| | type | | mechanical clamping | needle | needle | mechanical clamping | mechanical clamping |

TABLE 3-continued

| | | | | | | |
|---|---|---|---|---|---|---|
| injection pressure (MPa) | MPa | 100 | 100 | 100 | 80 | 130 |
| die temperature (° C.) | ° C. | 50 | 50 | 50 | 80 | 150 |

| | | unit | Example 6 | Example 7 | Example 8 | Example 9 |
|---|---|---|---|---|---|---|
| Molded Product | porous body (a) | — | F-6 | F-8 | F-8 | F-1 |
| | injection molding material (b) | — | S-1 | S-1 | S-1 | S-5 |
| | percent change in apparent density | % | 20 | 30 | 30 | 10 |
| | depth of anchoring of (b) in (a) | μm | 340 | 420 | 420 | 100 |
| | thickness of (A) | mm | 10 | 10 | 10 | 10 |
| | thickness of (B) | mm | 1 | 2 | 2 | 1 |
| | rate of coverage by injection molded body (A)/(B) | % | 95 | 95 | 50 | 98 |
| | form of joining | | fusion | absent | absent | existent |
| Production Method | insertion | existent or absent | existent | existent | existent | existent |
| | holding member | existent or absent | existent | existent | absent | existent |
| | type | | mechanical clamping | mechanical clamping | — | mechanical clamping |
| | injection pressure (MPa) | MPa | 100 | 100 | 100 | 100 |
| | die temperature (° C.) | ° C. | 50 | 30 | 50 | 70 |

TABLE 4

| | | Unit | Comparative example 1 |
|---|---|---|---|
| Molded product | porous body (a) | — | F-7 |
| | injection molding material (b) | — | S-1 |
| | percent change in apparent density | % | 1 |
| | depth of anchoring of (b) in (a) | μm | 0 |
| | thickness of (A) | mm | 2 |
| | thickness of (B) | mm | 10 |
| | rate of coverage by injection molded body (A)/(B) | % | 95 |
| | form of joining | | fusion |
| Production method | insertion | existent or absent | existent |
| | holding member | existent or absent | existent |
| | type | | mechanical clamping |
| | injection pressure (MPa) | MPa | 100 |
| | mold temperature (° C.) | ° C. | 50 |

INDUSTRIAL APPLICABILITY

The present invention can provide a molded product having both small specific gravity and high stiffness and also suffering few sink marks, and also provide a method for the production thereof.

EXPLANATION OF NUMERALS 1a to 1f: single fiber
2: two dimensional orientation angle
3: molded product
4: width of molded product
5: thickness of molded product
6: porous body (A)
7: injection molded body (B)
8: movable member
9: fixed member
10: holding member (mechanical clamping mechanism)
11: porous body (a)
12: injection molding machine
13: holding member (needle mechanism)

The invention claimed is:

1. A molded product comprising a porous body (A) integrated with an injection molded body (B), the porous body (A) having an apparent density of 0.05 to 0.8 g/cm$^3$,
the average thickness (tA) of the porous body (A) and the average thickness (tB) of the injection molded body (B) satisfying the relation tA≥3×tB, and
the injection molded body (B) covering at least one face of the porous body (A).

2. A molded product comprising a porous body (A) integrated with an injection molded body (B),
the porous body (A) having an apparent density of 0.05 to 0.8 g/cm$^3$,
the average thickness (tA) of the porous body (A) and the average thickness (tB) of the injection molded body (B) satisfying the relation tA≥3×tB, and
the injection molded body (B) covering at least part of the surface of the porous body (A) in the molded product.

3. A molded product as set forth in claim 1, wherein the minimum thickness of the porous body (A) is 3 mm or more.

4. A molded product as set forth in claim 1, wherein the maximal thickness of the injection molded body (B) is 1 mm or less.

5. A molded product as set forth in claim 1, wherein the porous body (A) is an interconnected-cell porous body.

6. A molded product as set forth in claim 1, wherein the porous body (A) contains reinforcing fibers (A-1) and thermoplastic resin (A-2).

7. A molded product as set forth in claim 6, wherein:
the porous body (A) is an interconnected-cell porous body,
the reinforcing fibers (A-1) are carbon fibers having a mass average fiber length of 1 mm or more and 15 mm or less, and
they are joined to each other via a thermoplastic resin (A-2) to form voids.

8. A molded product as set forth in claim 6, wherein the reinforcing fibers are substantially in the form of monofilaments.

9. A molded product as set forth in claim 6, wherein the reinforcing fibers are randomly dispersed in the porous body (A).

10. A molded product as set forth in claim 1, wherein 80% or more of the entire surface of the porous body (A) is covered by the injection molded body (B).

11. A molded product as set forth in claim 1, wherein the injection molded body (B) contains a thermoplastic resin, and the thermoplastic resin is joined by fusion with the thermoplastic resin present in the porous body (A).

12. A molded product as set forth in claim 1, wherein the injection molded body (B) penetrates the porous body (A) to form an anchoring structure, and the anchoring depth is in the range of 10 μm to 100 μm.

* * * * *